United States Patent [19]

DeBeni et al.

[11] Patent Number: 4,745,906
[45] Date of Patent: May 24, 1988

[54] PASSIVE HEAT TRANSFER DEVICE

[75] Inventors: Gianfranco DeBeni, Cadrezzate; Rudolf Friesen, Biandronno, both of Italy

[73] Assignee: European Atomic Energy Community (EURATOM), Ispra, Italy

[21] Appl. No.: 49,898

[22] Filed: May 15, 1987

[30] Foreign Application Priority Data

May 22, 1986 [LU] Luxembourg ............................ 86434

[51] Int. Cl.$^4$ ................................................ F24J 2/40
[52] U.S. Cl. ..................... 126/419; 126/423; 126/433; 126/434; 165/104.22; 417/207
[58] Field of Search .............. 126/433, 434, 435, 419, 126/417, 436, 423; 165/104.18, 104.22, 104.22 A; 237/59, 60, 61, 63; 62/333; 417/207, 90, 108, 208

[56] References Cited

U.S. PATENT DOCUMENTS

| | | | |
|---|---|---|---|
| 2,366,955 | 1/1945 | Burggrabe | 62/333 |
| 4,061,131 | 12/1977 | Bohanon | 165/104.22 A |
| 4,308,912 | 1/1982 | Knecht | 165/104.22 A |
| 4,340,030 | 7/1982 | Molivadas | 126/434 |
| 4,366,853 | 1/1983 | Bernier | 165/104.22 A |

FOREIGN PATENT DOCUMENTS

| | | |
|---|---|---|
| 2390685 | 12/1978 | France . |
| 48501 | 1/1985 | Japan ............ 165/104.22 A |
| 8302149 | 6/1983 | PCT Int'l Appl. . |
| 2103782 | 2/1983 | United Kingdom . |
| 2158220 | 11/1985 | United Kingdom . |

OTHER PUBLICATIONS

Patents Abstracts of Japan, vol. 9, No. 114 (M-380) [1937], May 18, 1985; and JP-A-60 290 (Matsushita Denki Sangyo K.K.) 01/05-1985.
Patents Abstracts of Japan, vol. 9, No. 213 (M-408) [1936], Aug. 30, 1985; and JP-A-60 71 855 (Nichiwa Aruminiumu K.K.) 04/23/1985.
Patents Abstracts of Japan, vol. 7, No. 287 (M-264) [1432], Dec. 21, 1983; and JP-A-58 160 767 (Zeneraku K.K.) 09/24/1983.
Patents Abstracts of Japan, vol. 7, No. 203 (M-241) [1348], Sep. 8, 1983; and JP-A-58 102 057 (Matsushita Denki Sangyo K.K.) Jun. 17, 1983.

Primary Examiner—James C. Yeung
Attorney, Agent, or Firm—Sughrue, Mion, Zinn, Macpeak & Seas

[57] ABSTRACT

The invention relates to a device for passive heat transfer between a heat source and a condenser (6) by means of a vaporizable liquid and a cycle with two phases controlled by a float valve (2, 4, 11). This device comprises a boiler (1) heated by said source and a liquid tank (9), the boiler furnishing, during a first cycle phase, vapor to the condenser which then supplies the tank with liquid, and receiving, during the second cycle phase, liquid from said tank. According to the invention, a vapor separator (3) is interposed between the boiler and the condenser, and the float valve (2, 4, 11) is disposed inside this separator and makes communicate, during the first cycle phase, the vapor space of the separator with the vapor space of the boiler (1), and, during the second cycle phase, the vapor space of the separator (3) with the vapor space of the tank (9), while cutting off these communications during the respective inverse cycle phase.

4 Claims, 1 Drawing Sheet

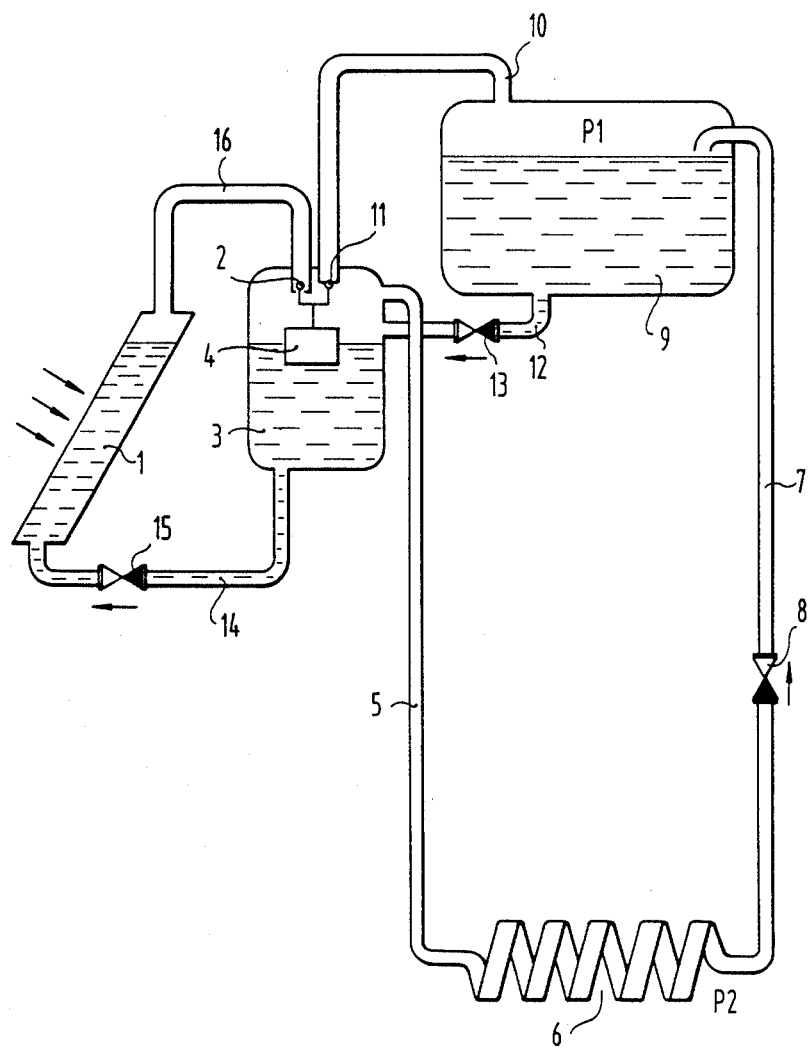

PASSIVE HEAT TRANSFER DEVICE

The invention relates to a passive heat transfer device for transferring heat between a heat source and a condenser by means of a vaporizable liquid and a two-phase cycle controlled by a float valve, said device comprising a boiler heated by said source and a liquid tank, the boiler furnishing, during a first cycle phase, vapour to the condenser, which then supplies the tank with liquid, and receiving, during the second cycle phase, liquid coming from said tank. Such a device is known for example from the document GB-B-21 03 782.

Passive heat transfer means that there is no other energy available but heat, i.e. neither pumps nor compressors can be used. Such devices for passive heat transfer are known for example for domestic heating, when the heat source, a boiler, is situated at the ground floor and the radiators at the upper floors. A natural circulation of a heat-carrying liquid is then established between the boiler and the radiators. This natural circulation is, however, no more established, when the heat source is disposed above the radiators. This is for example the case, when a solar heat collector, which is disposed on the roof of a building, is intended to supply heat to this building.

For such an application, the document EP-B-0 046 043 proposes a system with two tanks, which are connected by at least one tube and in which one of the tanks is associated to the solar heat collector and the other can be disposed below the first tank. This other tank comprises an elastic cushion, for example a compressible gas piston, and receives during the day-time vapour which condenses there and which rises progressively the inner pressure of the tank. During the night, when the vapour production in the upper tank is stopped, the liquid mounts from the elastic tank to the first tank.

The size of the tanks must be such that the upper tank is never completely emptied during a sunny day. In order to reduce the size of the tanks, the document GB-B-21 03 782 teaches a passive heat transfer device which functions according to a two-phase cycle under the control of a float valve which is disposed in an additional tank. This tank is situated near the upper tank and receives liquid coming from the condenser. As soon as the liquid in this tank reaches a certain level, the valve is opened and pours heat-carrying liquid into the tank which is associated to the solar heat collector and which serves as boiler. The level of the liquid in this tank thus decreases rapidly, the float valve closes again and the cycle starts again. While the sun shines, the vapour produced in the boiler descends towards the condenser and condenses there. Hence, the liquid is sent upwards in the direction of the tank when the pressure is lower than the pressure in the condenser due to the liquid column between these two elements, in order to make work the pouring of liquid towards the boiler during the second phase of the cycle, the pressures in the tank and in the boiler have to be equalized. There are thus two connections between the boiler and the tank, i.e. a connection for the transfer of heat-carrying liquid, which only comprises a no-return valve, and a connection between the vapour spaces of these two tanks, this connection being apt to be closed by the float valve.

It has been observed during tests that the temperature in the tank mounts considerably during the second phase of the cycle, because a non negligible quantity of vapour passes from the boiler through the float valve to the tank. The boiler, which must work at a higher temperature than that of the tank, is then at a too high temperature level, which reduces the efficiency of the solar heat collector.

The invention aims to improve the device known from GB-B-21 03 782 and proposes a device for passive heat transfer ensuring a better efficiency in association with a solar collector as primary energy source.

According to the invention, the device is characterized in that a vapour separator is interposed between the boiler and the condenser and that the float value is disposed inside this separator and makes communicate, during the first cycle phase, the vapour space of the separator with the vapour space of the boiler, and during the second cycle phase, the vapour space of the separator with the vapour space of the tank, while cutting off these communications during the respective inverse cycle phase.

No-return valves are disposed in the communication tubes passed through by the liquid and connecting the different elements of the device.

The invention will now be described more in detail by means of a preferred embodiment of the invention and the unique FIGURE, which shows schematically a device according to the invention.

A boiler 1 is associated to or integrated into a solar heat collector (not shown) and it is almost completely filled with a heat-carrying liquid, which is heated either directly by irradiation, or by means of a fluid such as water. The heat-carrying liquid is a product with low boiling point such as a fluorocarbon compound. The vapour space of the boiler is connected via a tube 16 to the vapour space of a tank 3, which constitutes an intermediate tank and a separator. The lower part of this separator 3 is connected through a tube 14 and a no-return valve 15 to the liquid space of the boiler 4. The valve allows the passage of the liquid only towards the boiler.

Inside the separator 3 there is a float 4, which is associated to a double effect valve 2, 11, closing alternatingly the end of the tube 16 and the end of another tube 10, which connects the vapour space of the separator 3 to the vapour space of a tank 9 situated at a higher level than the boiler 1 and the separator 3. When, during the filling of the separator 3 the liquid reaches a predetermined level therein, the tube 10 is blocked and the tube 16 makes the boiler 1 communicate with the separator 3. This corresponds to the first phase of the working cycle. If the level in the separator 3 decreases, the float 4 moves and closes the valve 2 in the tube 16 while simultaneously opening the valve 11 in the tube 10. As it is known, it is possible to foresee a certain hysteresis; that is a gap between the level at which there is a passing from the first to the second cycle phase and the level at which the first cycle phase is again activated.

The liquid space of the tank 9 is connected on the one hand by a tube 12 to the separator 3 and on the other hand by a tube 7 to a condenser 6 located at a notably lower level than the other elements of the device. In these two tubes 7 and 12, there are no-return valves 8 and 13 preventing the liquid from falling down in the tube 7 and from being transferred from the separator 3 to the tank 9 respectively. Finally, the condenser 6 is connected by a vapour tube 5 to the vapour space of the separator 3.

The device functions as follows:

After a night's rest, the liquid levels in the boiler 1 and the separator 3 are equal and sufficient for the float 4 to close the tube 10 and to keep open the communication between the vapour space of the boiler and the vapour space of the separator 3 through the tube 16. As soon as the sun starts to produce vapour in the boiler 1, this vapour passes through the tube 16 into the separator, where droplets of liquid are separated from this vapour before the latter descends through the tube 5 to the condenser 6. There, the vapour is cooled and condenses, the liquid passes back through the valve 8 and the tube 7 to the tank 9. The valve 11 being closed, this liquid cannot come back into the separator 3 through the tube 12, because the pressure P1 in the tank 9 is essentially lower than the pressure P2 of the vapour space of the separator 3, this being due to the liquid column in the tube 7 between the condenser 6 and the tank 9. The liquid thus accumulates in the tank 9, whereas the level in the separator 3 decreases.

As soon as this level in the separator reaches a predetermined value, the valve 2 in the tube 16 close and the valve 11 in the tube 10 opens. The pressure in the separator 3 becomes immediately equal to the pressure P1 of the tank 9 and the liquid passes through the tube 12 and the valve 13 to the separator 3. The liquid level thus rises in the separator and the float 4 closes again the valve 11 and reopens the valve 2. The second phase of the cycle, during which liquid is transferred from the tank to the separator is thus of short duration with respect to the first phase. Even if the vapour production continues during this second phase in the boiler 1, a dangerous pressure cannot happen during this short time. If necessary, a discharge valve can be provided for security reasons. This discharge can be realized by the valve 15 when the latter is conceived for an incomplete closing.

Due to the obturation of the tube 16 by the valve 2, the quantity of hot vapour transferred from the boiler to the tank during the second phase of the cycle is very small. The tank thus practically cannot heat up above the temperature at which the liquid comes out of the condenser 6. Another advantage of the separator is that the vapour descending through the tube 5 to the condenser is relatively dry, which reduces the quantity of liquid to be transferreed towards the tank 9. These two effects can improve the heat transfer efficiency especially during long periods of reduced sunshine, i.e. of low temperature of the solar collector.

The invention is not limited to the embodiment described in detail. Within in the frame of the invention, the float valve can be supplied with means ensuring a net commutation between the two positions by reducing the transitory periods. Such means have for example been described in the document GB-B-21 03 782 cited above.

We claim:

1. In a passive heat transfer device comprising: a vaporizable liquid circulation loop having a boiler connected in series with a condenser mounted below the boiler, said loop carrying a vaporizable liquid for transferring heat from said boiler constituting a heat source by means of said vaporizable liquid, said boiler having a vapour space, said device further including a liquid tank having a vapour space and being connected in said loop in series with said condenser and positioned above said boiler and between said condenser and said boiler, such that said boiler furnishes during a first cycle phase, vapour to the condenser which then supplies the tank with liquid, and receiving, during the second cycle phase, liquid from said tank, the improvement comprising:

a vapour separator (3) having a vapour space, and being positioned within said loop and interposed between the boiler (1) and the condenser (6) and between the tank and said boiler and a float valve (2, 4, 11) disposed inside said vapour separator, said float valve including means communicating, during the first cycle phase, the vapour space of the separator with the vapour space of the boiler and for cutting off communiction between the vapour space of the separator and the vapour space of the tank (9) and during a second cycle phase, communicating the vapour space of the separator with the vapour space of the tank and cutting off communication between the vapour space of the separator and the vapour space of the boiler such that the quantity of hot vapour transferred from the boiler to the tank (9) during the second phase of the cycle is quite limited, the tank (9) is essentially prevented from heating up above the temperature at which liquid is fed thereto from the condenser (6), the vapour descending from the separator to the condenser is relatively dry thereby reducing the quantity of a liquid to be transferred from the condenser to the tank (9) and thereby improving the heat transfer efficiency especially during periods of low supply of heat to said heat source.

2. A device according to claim 1, wherein a non-return valve (8, 13, 15) is disposed in at least one tube (7, 12, 14) connecting the condenser (6) to the tank (9); the tank (9) to the separator (3); the separator (3) to the boiler (1), and through which the liquid passes.

3. A device according claims 1 or 2, wherein the boiler (1) is integral with a solar heat collector and said heat source comprises solar radiation.

4. A device according to claim 2, wherein a non-return valve (8, 13, 15) is disposed in each of said tubes (7, 12, 14) connecting said condenser (6) to said tank (9); the tank (9) to said separator (3); and the separator (3) to said boiler (1).

* * * * *